US006844893B1

(12) United States Patent
Miller et al.

(10) Patent No.: US 6,844,893 B1
(45) Date of Patent: Jan. 18, 2005

(54) RESTAURANT VIDEO CONFERENCING SYSTEM AND METHOD

(75) Inventors: William G. Miller, Washington, DC (US); Richard Phipps, Arlington, VA (US)

(73) Assignee: Looking Glass, Inc., Washington, DC (US)

( * ) Notice: Subject to any disclaimer, the term of this patent is extended or adjusted under 35 U.S.C. 154(b) by 0 days.

(21) Appl. No.: 09/263,812

(22) Filed: Mar. 8, 1999

Related U.S. Application Data

(60) Provisional application No. 60/077,320, filed on Mar. 9, 1998.

(51) Int. Cl.[7] .................................................. H04N 7/14
(52) U.S. Cl. ....................... 348/14.1; 349/14.01; 705/15
(58) Field of Search ................ 348/14.01, 14.03–14.04, 348/14.08–14.09, 14.1, 14.11; 379/93.12–93.13, 93.21, 110.01, 202.01, 373.01, 202; 725/109–113; 186/38; 705/15

(56) References Cited

U.S. PATENT DOCUMENTS

| 4,074,793 | A | * | 2/1978 | Yuter ........................... 186/38 |
|---|---|---|---|---|
| 4,800,438 | A | * | 1/1989 | Yuter ..................... 379/110.01 |
| 5,374,952 | A | * | 12/1994 | Flohr ....................... 348/14.08 |
| 5,508,733 | A |   | 4/1996 | Kassatly ........................ 725/93 |
| 5,572,248 | A | * | 11/1996 | Allen et al. ................. 348/14.1 |
| 5,598,351 | A | * | 1/1997 | Chater et al. ............. 348/14.08 |
| 5,666,291 | A |   | 9/1997 | Scott et al. .................. 709/250 |
| 5,801,755 | A | * | 9/1998 | Echerer .................... 348/14.01 |
| 5,929,849 | A | * | 7/1999 | Kikinis ........................ 725/113 |
| 6,088,681 | A | * | 7/2000 | Coleman et al. .............. 705/15 |
| 6,292,211 | B1 | * | 9/2001 | Pena ........................ 348/14.08 |

OTHER PUBLICATIONS

Chicago's Very Own Blues Return Home for the Grand Opening of House of Blues–Chicago, Nov. 24, 1996.*
Coffeehouses, Eateries Get Interactive, Nov. 23, 1996.*
Apple to Meld Food, Computers At CYbercafes, Nov. 13, 1996.*

* cited by examiner

*Primary Examiner*—George Eng

(57) ABSTRACT

The invention is a system and a method which combines restaurant services with video-conferencing and multi-media access for diverse customer appeal. The system and method employ a number of booths in a number of restaurants whereby each booth can video-conference with each other booth, particularly in different time zones, while also providing multi-media access such as satellite TV, cable, broadcast TV, computer programs and gaming, internet access. Each booth is linked to a local area network and is equipped with a display screen and video and audio controls. The local area network of each restaurant is linked to the local area network of each other restaurant forming a corporate intranet that allows media uses and various management capabilities such s scheduling, accounting, security, training and the like.

9 Claims, 6 Drawing Sheets

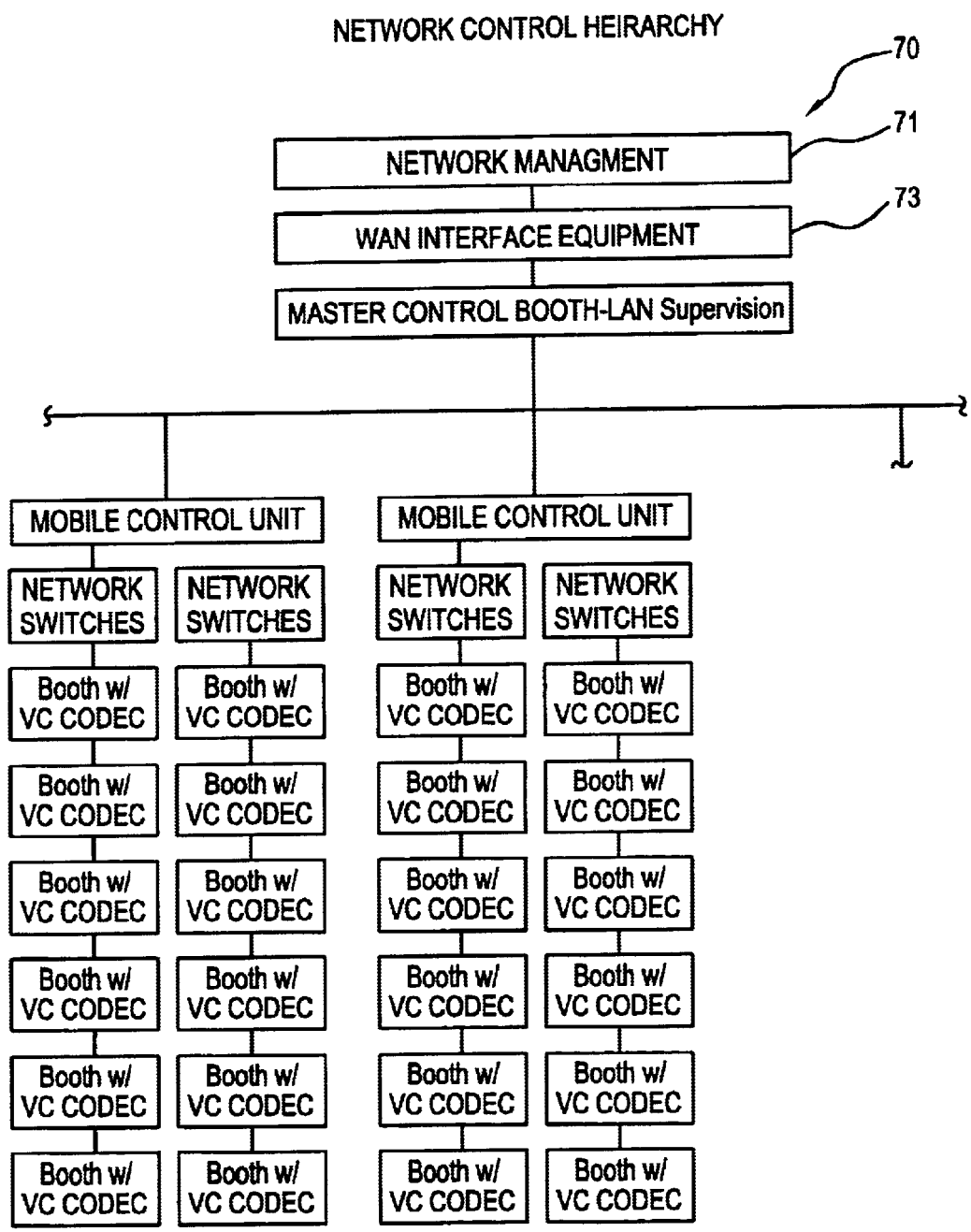

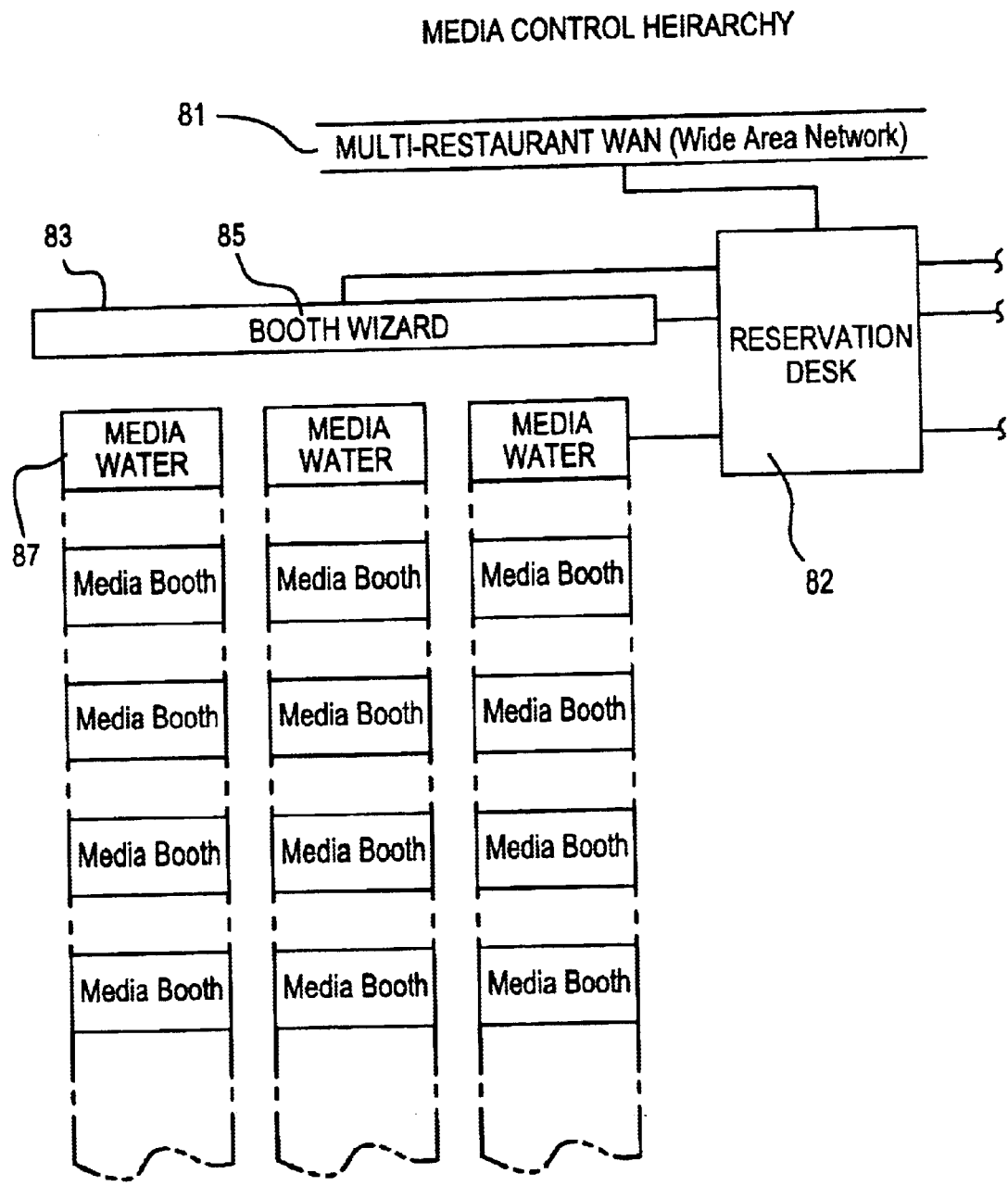

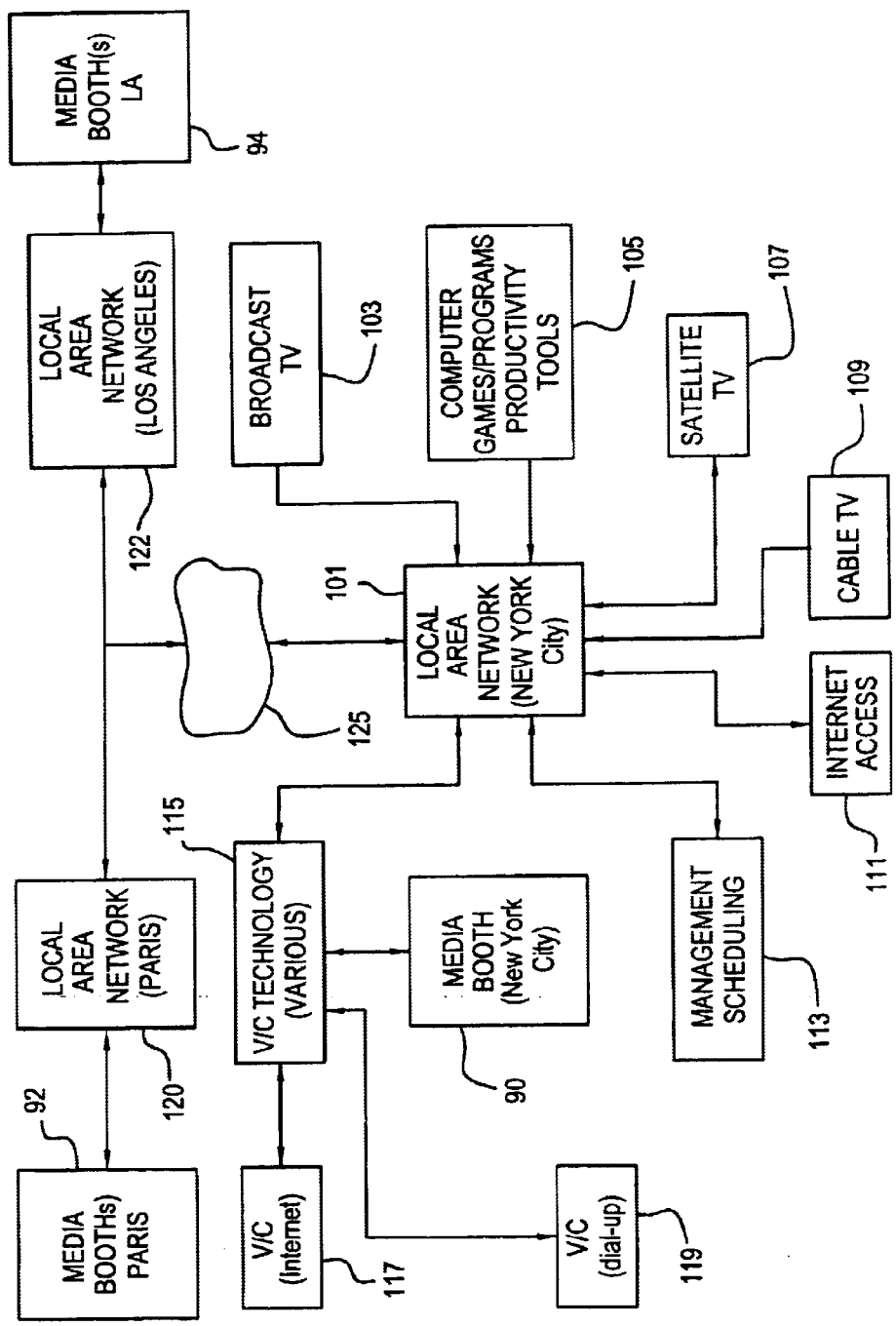

RESTAURANT VIDEO CONFERENCING SYSTEM AND METHOD

This application claims the benefit of Provisional application Ser. No. 60/077,320, filed Mar. 9, 1998.

FIELD OF THE INVENTION

The present invention is directed to a restaurant video conferencing system and method, and, in particular, to a system and method which combines video conferencing and interactive capabilities in a restaurant environment.

BACKGROUND ART

In the prior art, restaurants touting various themes have proliferated. Examples include HARD ROCK CAFE, PLANET HOLLYWOOD, RAINFOREST CAFE, DAVE & BUSTERS, ESPN GRILL and the like.

Other ventures have combined Internet access with food, e.g., CYBERSMITH, an Internet cafe chain serving coffee and light fare.

Still others employ gaming such as DAVE & BUSTER'S and SEGA GAMEWORKS, i.e., electronic gaming in a quasi-nightclub environment.

U.S. Pat. No. 5,572,248 to Allen et al. discloses the concept of video-conferencing whereby participants at one or more remote stations may be imaged and displayed in a video mirror at the station so that they appear to be present or face-to-face with any participants at the station.

None of the prior art noted above teaches or suggests the instant invention wherein a number of booths in a number of restaurants are equipped for multi-media access so that the restaurant can provides restaurant services in combination with video-conferencing, and other multi-media access. The invention permits revenue generation beyond the conventional restaurant revenue sources of food, retail merchandise, and liquor during three eating time periods per day.

SUMMARY OF THE INVENTION

A first aspect of the invention includes at least two restaurants, each in a different location, preferably locations having different time zones. Each restaurant is equipped with media booths and the necessary networking equipment so those one or more individuals in one restaurant can videoconference and dine with one or more individuals at one or more other restaurants.

Another aspect of the invention is the combination of dining, video-conferencing and other events such as:

a) broadcast/entertainment such as television, cable, pay-for-view;

b) Internet browsing and/or gaming;

c) gaming, such as interactive CD-ROM/DVD, d) custom events such as educational seminars, business/social functions, etc.;

e) productivity tools, shared documents/spreadsheets, electronic presentations such as power point, video, whiteboard, and the like;

f) merchandising (on premise and web-based retail sales/merchandising); and g) restaurant reservations, dining orders and other restaurant related activities.

The restaurant can also include a video wall as part of the restaurant, preferably the bar. The video wall could show another restaurant scene, or any of the events/media types mentioned above for the media booth.

A further aspect of the invention is the presence of media phone booths that have videoconferencing capability independent of the dining media booths. The phone booths can universally connect to other videoconferencing systems and standards throughout the world. Thus, patrons are not limited to the videoconferencing between restaurants.

The restaurant can also have computers located in the bar area to permit restaurant patrons to connect to the Internet for their own purpose or to other network resources, e.g., the restaurant's own resources.

In one embodiment, the booths are arranged to maximize the dining effect with a curved, e.g., horseshoe-shaped patron seating area and a wide-screen display that gives each diner(s) the appearance that the diner(s) at the remote location is present at his/her table. A single wide-angle video camera coupled with high efficiency microphones and specially located speakers integrate with the videoconferencing equipment to provide a unique dining experience for all patrons.

The invention also encompasses a multiplicity of media booths in one location whereby patrons can dine and videoconference, or participate in any of the non-video-conferencing activities described above.

The multi-restaurant videoconferencing employs a network system for its operation. The system includes a network management system that links each restaurant together. Each restaurant then utilizes wide area network interface equipment that is linked to the network management system and ultimately connects every booth to the desired activity, e.g., videoconferencing, Internet, TV, gaming, restaurant services, etc. An exemplary component list is described below as well as media control and network control hierarchies. The hierarchies describe the manner in which the patrons in a media booth interface with the booth equipment and restaurant personnel for participating in the desired activity. It should be understood that other types of components could be utilized as long as the functions described herein can still be performed.

The invention also includes a method of combining videoconferencing with the serving of food/beverages in restaurant setting where the videoconferencing permits visual and audio connection between patrons in different restaurant settings. The method is particularly advantageous when the restaurants are in different time zones since one or both restaurants can increase the number of turns per day, thereby increasing profits. The time zone difference can be significantly advantageous when the restaurants are located far apart, e.g., Tokyo and New York City. In this instance, the restaurant may be able to entertain patrons during off-hours, these off-hours normally going unused in the restaurant.

Besides the videoconferencing, restaurant patrons can combine one or more of the other activities made available at the media booth.

Another aspect of the invention is the ability to sell not only restaurant services but also media/telecommunication time, thereby increasing the per person check value for each restaurant patron. Existing videoconferencing sites cannot offer the combined restaurant services and media-related activities as does the invention.

Each restaurant can also employ a virtual room whereby the patrons could move about the room during the videoconferencing. Multiple hidden cameras, speakers and microphones in combination with a giant or life size monitor on a wall or the like can give the appearance that patrons in one room are in the same room with patrons at a different location.

The bandwidth capacity of each restaurant may provide the network the ability to sell communications bandwidth as a reseller to non-restaurant patrons. For example, an individual could buy communication time to transmit a video presentation or the like to a remote site.

The invention also entails a system or method having a first set of stations at a first restaurant site and a second set of stations at a second restaurant site remote from the first site, wherein each station has video conferencing capability between first and second site stations combined with one or more of the following;

1) web browsing at each station or shared web browsing between first and second site stations;
2) access to pay-per-view movies at each station and/or capability to share access between first and second site stations;
3) computer/video gaining capability at each station and/or capability to engage in gaming between stations;
4) each station can be partially or fully enclosed to separate it from adjacent stations at the same site, either by solid or see-through material;
5) video taping capability for each station and/or multiple stations;
6) sites are in different time zones to fully utilize restaurant capabilities during non-meal periods for a given site, i.e., increase earnings;
7) interactive communication between stations and restaurant personnel for restaurant services, e.g., reservations, ordering, etc., monitoring dinner or other event progress, ongoing taping reminder, assistance, etc.;
8) telephone link at each station;
9) document sharing between stations; and
10) picture-in-picture capability for each display.

BRIEF DESCRIPTION OF THE DRAWINGS

FIG. 5 shows an exemplary network system of the invention;

FIG. 6 shows an exemplary media control hierarchy of the invention; and

FIG. 7 shows an exemplary flowsheet depicting the multimedia access and video-conferencing for each booth and booths in different geographic locations.

DESCRIPTION OF THE PREFERRED EMBODIMENTS

Figure 1A:
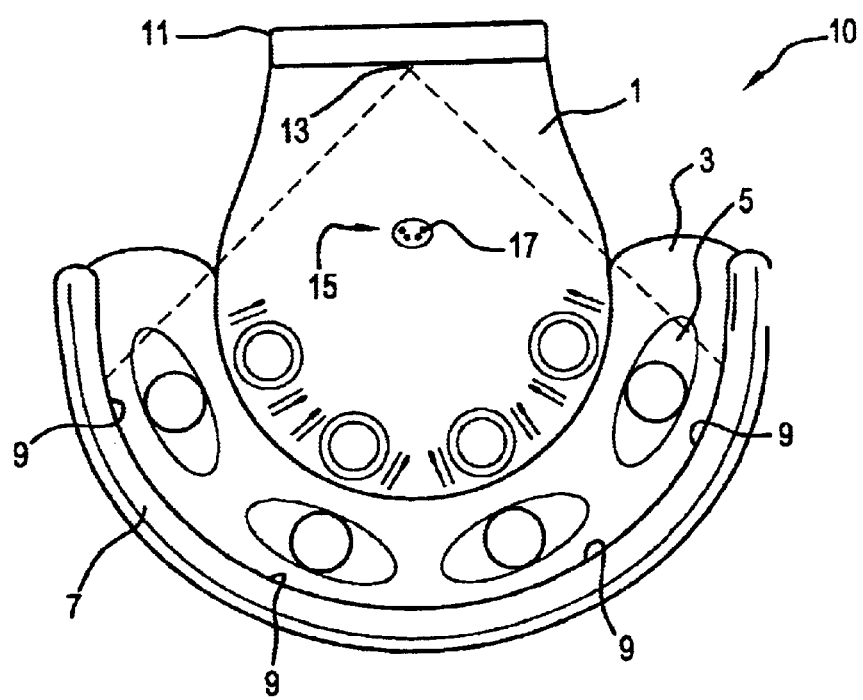
FIGS. 1A and 1B show an exemplary layout of one type of media booth in an exemplary setting, in a top and perspective view, respectively; a network system in terms of the switches and other hardware.

The invention entails a global network of landmark restaurants which converge grand cafe dining with communications and interactive media. It brings technology out of the office and home and into comfortable, stylish social settings where people can share in the use and enjoyment of media. Given the broad appeal—from executives to entrepreneurs, from friends to families, from techo-philes to technophobes, the invention is advantageous in presenting exceptional opportunities for technical showcasing, global branding, and attractive profitability.

The invention includes media booths, a number in each restaurant, each of which are preferably equipped with wide-screen plasma monitors, lightning fast computers and big-bandwidth connectivity. These personal theaters provide users with a virtual world of entertainment, enabling friends and associates to share sophisticated computer games, give 2.13 Power-Point presentations, surf ultra fast over the Web, or simply relax and enjoy pay-per-view or television events in elegant comfort. Even more unique, diners will sit in New York and share space with friends in Los Angeles, Paris or Tokyo with the unprecedented broadcast quality of MPEG 2 video-conferencing. By reducing costs dramatically and improving both quality and ease-of-use, the invention offers tele-meals that are as easy as a phone call and as comfortable as lunch.

The invention has number of distinct advantages over the super-theme restaurants and location-based entertainment markets: (1) higher average customer expenditure, (2) additional table turns, and (3) diverse customer appeal.

The higher average check, and thus, greater overall revenue, is attributable to having three sources of revenue—food & beverage, branded retail merchandise and media/communication charges.

Table turns, or customer counts, will be bolstered two ways. The restaraunts will be open for all three day parts (breakfast, lunch, dinner), and demand will actually stretch the typical meal periods since customers will come early and late to tele-dine with friends and associates in different time zones.

The diversity of consumer appeal is no less than the virtual world itself. The media booth allows groups to not only use and enjoy all forms of media, but to do so in an elegant social setting.

Favorable trends in the technology sectors benefiting the invention include improved bandwidth utilization, falling hardware and communications costs, and intensive new product R&D. Consumer behaviors are also positive—increased trade and travel, accelerated adoption of technology, and insatiable demand for new forms of entertainment. In fact, the useful and "interactive" nature of the invention will attract a more upscale, "regular" clientele than restaurants based on static memorabilia. Furthermore, tourist oriented "theme" restaurants actually dilute their concepts through expansion; whereas the invention employs a communications network that gains strength with growth.

By converging dining, an ancient ritual, with modern technology, the invention provides a high profile social showcase for both existing and future innovation as technology evolves In a preferred mode, the invention will employ the following media systems/capability:

Point of Sale (POS) system for coordinating food, beverage & retail activity.
Corporate Intranet for coordinating audio, video, and data, including POS.
Restaurant reservation system linked to all units in real time.
Phone system linked to all units.
Massive coordination/switching capability for video-conferencing.
Complete television access, including cable, broadcast and satellite.

T-lor faster access to Internet Service Provider (ISP) or to a direct link.

Server links with respective CPU's to provide gaming to all media booth.

The media booths will preferably have the following capabilities:

Monitors have television function hooked to full access cable and/or satellite;

Different pay-per-view programs can be routed to specific booths;

Narrow-cast programming can be routed to specific booths,

Different satellite programs can be routed to specific booths;

Customer's personal video or Power Point presentations can be routed to their respective booths;

Complete Web browsing capability, using all common browsers with the fastest commercially available connectivity speed;

Ultra fast processors, huge RA, state-of-the-art graphics card and enabling software;

For gaming, a link to central server (in house) for use of entire inventory;

Rigged for wireless keyboards, joy sticks and other game apparatus;

Booth equipped with sound cancellation;

Linked to Codec for videoconferencing capability;

Equipped with PIP function for media multi-tasking;

Capable of running television, PPV, Web browser or additional videoconference simultaneously;

Hooked up to VCR(s) for easy video copy(s) of video conferences;

Controlled remotely by host desk, central control booth, sectional control booths, and handheld Wizard computers;

CPU's and Codec's can be easily bypassed (patched to another device) if malfunctioning.

The inventive method and system also includes a reservation system. A hostess or reservation desk personnel can access a central data base and make bookings in two or more cities simultaneously. All control personnel-host(ess), reservationist, managers-can call up accurate up-to-the-moment status reports. Depending on their security clearance, this may include:

Reservation status in any restaurant, current or future;

Session progression of all booths in any restaurant, color coded by time remaining;

Usage pattern, current and future, for entire system and individual restaurants, An up-to-the-second accounting of media charges by booth, restaurant and system.

Upon receipt of a reservation, guests can be faxed or e-mailed confirmation and directions to their respective locations, as well as an up-to-date newsletter regarding media highlights. (Examples: new computer games available, upcoming pay-per-view programming, notable Web events.)

Guest reservation information flows automatically in a customer database for easy future booking, marketing programs, and potential mailing list sales. Credit card information from initial reservation flows into restaurant POS (Point of Sale) system for easy bill payment.

Video conference coordination is also an aspect of the invention. Hosts can establish video/audio connections between booths using a drag & drop systems (or some similarly easy method) on their host desk computers. Personnel in charge of the booths, booth wizards, can also establish connections from main or wizard booth, as well as monitor and troubleshoot media activity in any booth in the entire restaurant.

Personnel on the floor, i.e., floor wizards, can perform basic control functions using handheld computers units with a wireless control mechanism. They may have more comprehensive controls in media computers in each station.

Each restaurant can also have a video wall wherein multiple large monitors will function separately or in unison. Wide angle cameras will be positioned at intervals behind the bar, capturing the video images of customers in each location for transmission to video walls in other restaurants. Video walls will be capable of showing full range of media, including television, video recording, satellite, cable, computer-sourced or videoconferenced input. Video walls will be controlled from the Wizard Control Booth.

Each restaurant can also include video phone booths. Each video phone booth will seat two people and be equipped for a "dial-up" video conference. Each booth will have a credit card payment method, based on a per-minute fee schedule. Video phone booths are individually controlled, (i.e.: connected to other "dial-up" VC facilities) with assistance from a brief video instruction clip. Media waiters will also be nearby and booth wizards have final authority.

The restaurant can employ bar computers. Individual bar computers will be provided for rental on a per-minute basis. All bar computers can have high speed Web browsing features, typically at T-1 speeds or greater. All bar computers can be linked to a gaming server and will be equipped with built-in video cameras for video conferencing over the Internet. Each computer will be numbered and have pre-established links to similarly numbered bar top computers in other locations so friends can "meet each other" for a drink in different cities. Besides the dedicated media booths and the "dial-up" video phone booths, this is the third form of videoconferencing possible. All bar computers will be constructed to resist food or drink spillage and will be equipped to handle credit card transactions or provide time-keeping mode for payment collection at bar.

The booth wizards are stationed in a wizard control booth. Ultimate control of all media booths will rest in the wizard booth where one or more media experts will oversee and troubleshoot all activity. Ideally, this would be an elevated location where wizards can actually look out over the majority of the dining room but this function can also be achieved by remote video cameras. In case of malfunction, booth wizards will have the capability to instantly bypass any CPU or Codec. There will be sufficient redundancy built within the system. The booth wizards will work closely with host(esses), media waiters, and floor wizards using wireless headsets. Booth wizards will control all bar technology, including video wall, video phone booths, and bar top computers. During off peak and closed hours, media wizards will perform routine and deep diagnostics as per predetermined schedule.

Each restaurant will have a central computer room holding central servers, Codecs, and all computer and electronic coordination systems will be housed in an appropriately cooled and secure room. Systems will be designed for maximum ease of diagnostics, repairs, and upgrades. In case of malfunction, a prudent number of replacement components will be kept on hand. If needed, additional units will be shipped according to "just in time" methodology.

Each restaurant will be linked to a corporate intranet for secure exchange of video, audio and data. Management data will be sent to a head office throughout the day, and complete reports will be sent every evening. These will be first compared automatically against operating standards to ensure no large errors, omission, or deviations, then compiled into system-wide data summaries.

Food, beverage, and retail operations in each restaurant will be controlled by a POS system. Features will also include time-keeping, inventory control, financial reporting, etc. POS system will interface with reservation system and customer data base, if practical. POS data for individual restaurants and the entire system will be accessible through the corporate Intranet.

Figure 1B:
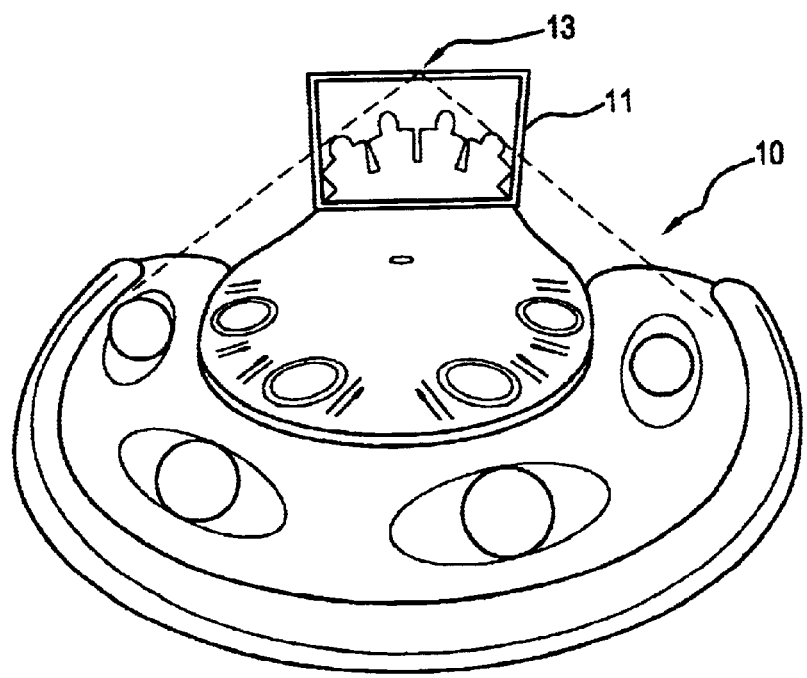

FIGS. 1A and 1B show an exemplary booth 10 having a table 1 and a seat 3 for users 5. The seat 3 and users 5 are surrounded by a glass partition 7 and surround sound speakers 9. Each table 1 has a display 11, camera 13 and audio/video control 15 with microphones 17.

FIG. 1B shows the image 19 from a remote booth in another restaurant employing similar booths.

Figure 2:
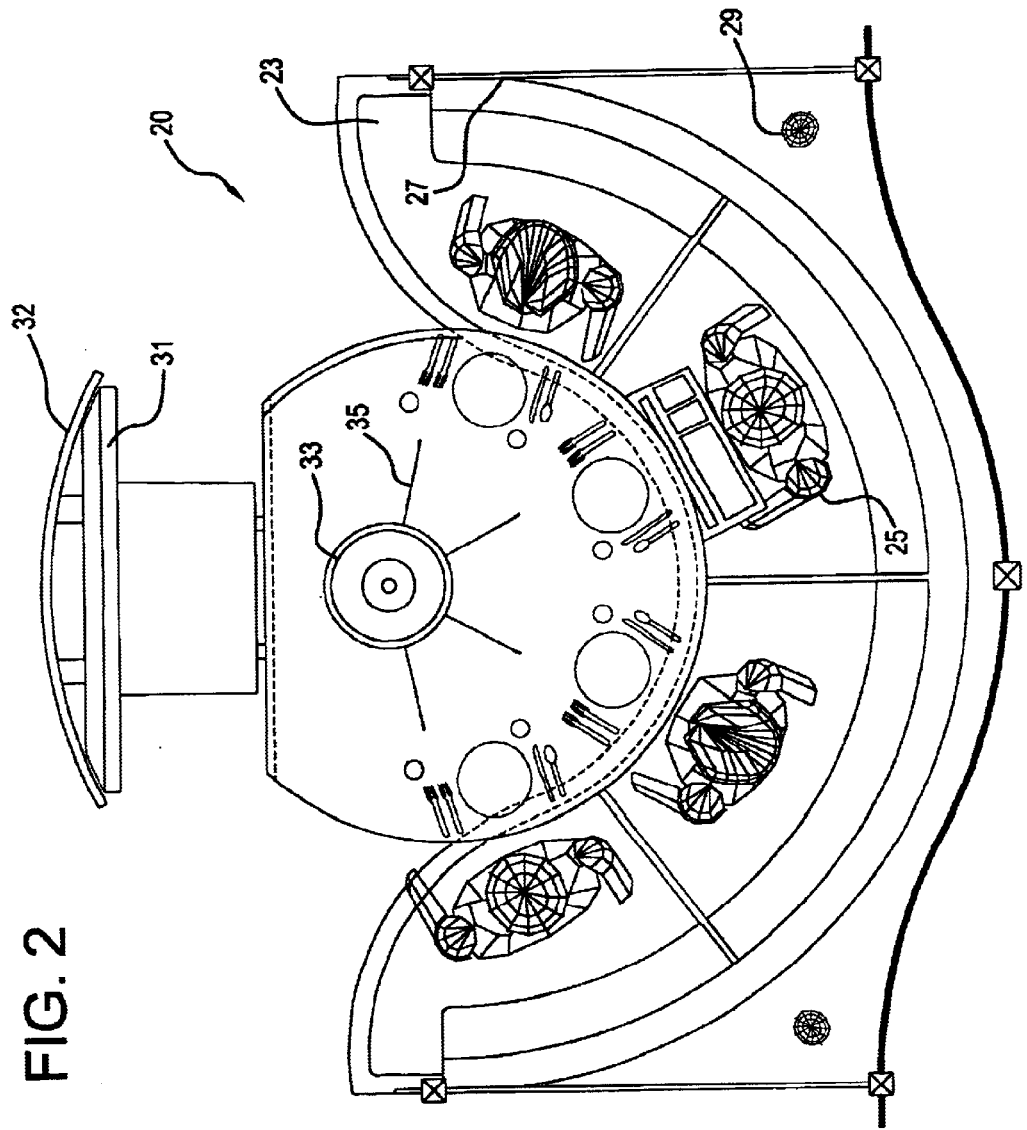
FIG. 2 shows a second exemplary plan view layout of media booth in an exemplary setting.

FIG. 2 shows an alternative booth 20 with table 21, seat 23 and users 25. A glass partition 27 and speakers 29. At the end of the table 21 is the display 31 and display back 32. On the table 21 is the control 33 with speakers.

Figure 3:
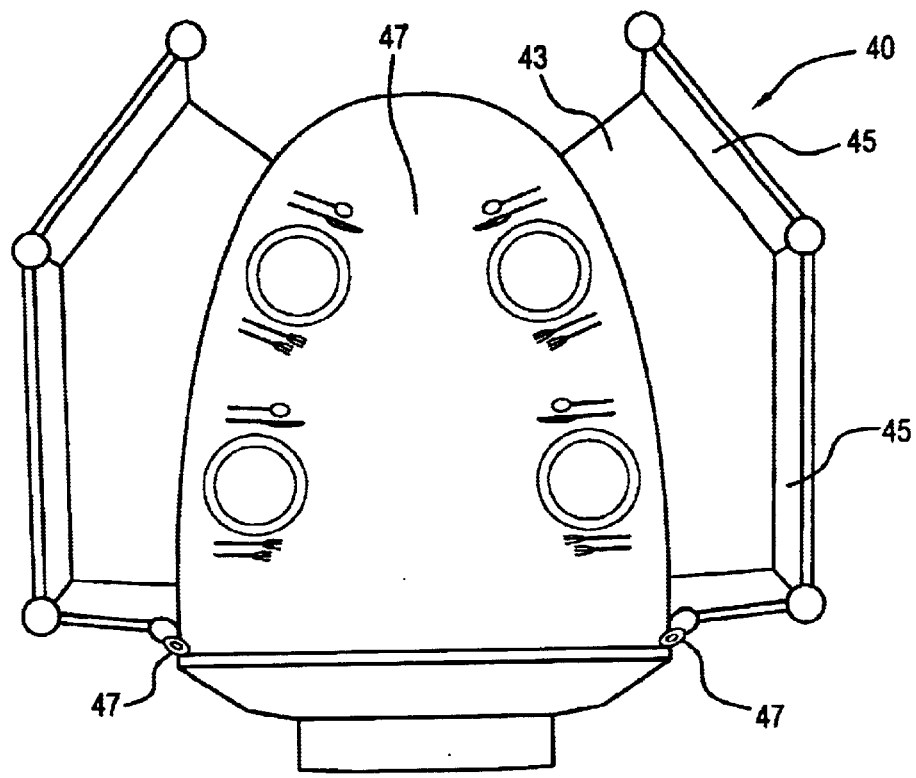
FIG. 3 shows a third exemplary plan view layout of media booth in an exemplary setting.

FIG. 3 shows another booth 40 employing a table 41, a seat 43, a glass enclosure 45, and a pair of cameras 47.

Figure 4:
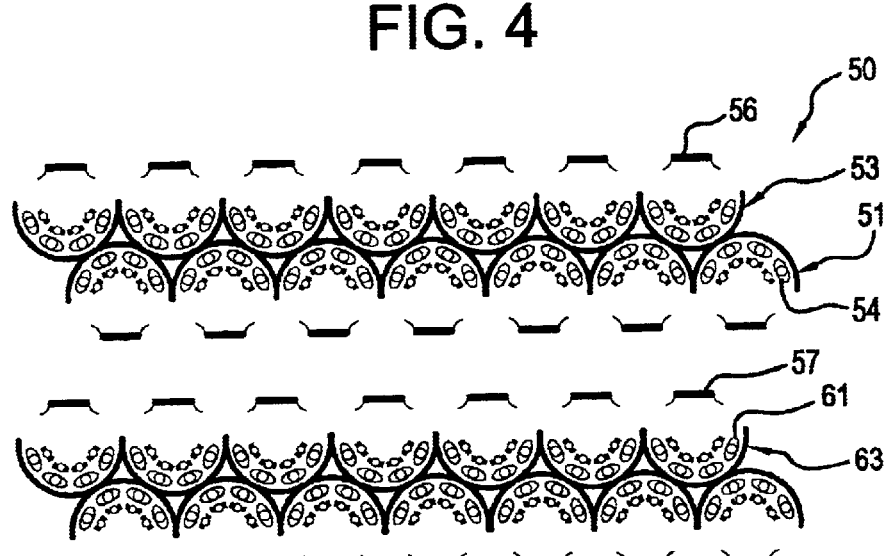
FIG. 4 shows a number of media booths in a restaurant setting

FIG. 4 shows a plurality of booths 50 arranged for maximum privacy. The rear of booth 51 opposes booth 53 so that the users of booth 51 do not easily see the display 56 of booth 53 and the users of booth 53 do not easily see the display 59 of booth 51. Similarly, the users 61 of booth 63 do not easily see display 59 of booth 51 for a comfortable level of privacy. For maximum privacy, a certain percentage of booths could be surrounded by privacy walls if so desired.

FIG. 5 shows an exemplary wide area network 70 which connects every booth to multi-media, information and communication. At the top of the network 70 is a center for overall network management system 71 such as a Newbridge 46020 package for the monitoring of connections and overall bandwidth utilization. This interfaces with a major wide area network interface device 73 in each restaurant, as typified by a Newbridge 46170 MainstreetXpress switch. This device in turn coordinates all of the smaller switches, typically Newbridge 36150 units, which each controls the network activity, particularly the video-conferencing, of a number of individual media booths, each equipped with or linked to a CPU, a CODEC card, a display monitor and other devices for other multi-media access.

FIG. 6 shows a wide area network 81 connecting every booth in the system to multi-media, information, and communication. The network tracks all the information at all locations with a reservation system 82, much like an airline system as are known. When parties arrive at their respective booths, the host or hostesses are in communication via the network to confirm mutual arrival. The parties are then seated and a media waiter verifies the connection, supplies any additional equipment that may be requested, e.g., a cordless keyboard, and answers any questions. Floor wizards (not shown) carry wireless control pads which enable them to perform most media set-ups and adjustments. Booth wizards 83 in control booths 85 monitor; all floor wizard activities. The booth wizards 85 communicate with the media waiters 87 via wireless headsets and adjust all tables and technical activities in the restaurant.

More specific booth equipment includes an echo canceller, RF receiver, power and volume controls, a multimedia computer, graphics card, 42" flat plasma display (800×600), pod microphone booth audio mixer, shaker speaker, booth speakers. The media waiter equipment includes a control system, control panel, wireless wave pack, spare battery, charger, VCR, and a lavalier or other wireless microphone.

Management equipment includes a CD-ROM server, a satellite dish, satellite coordination hardware, central servers, wireless mobile control computers, and wizard booth consoles. In a preferred mode, real time information, much like airline reservation systems use, is employed as part of the reservation process and linking customers for actual dining. For example, reservations would be taken and a scheduling system would be employed to check availability for each restaurant. If availability exists, reservations are made. When customers arrive in each location, a host(ess) or reservation specialist would link a party in one restaurant with a party in another restaurant. Preferably, such linking would be done with a drop and drag computer screen system whereby, the specialist could merely drop down a menu and drag an icon or the like representing one party, say in New York, to another icon or the like representing another party in Paris to make the video connection. Other systems as are known in the art can also be utilized.

The equipment for the networking is known in the art and a further description thereof is not deemed necessary for understanding of the invention.

FIG. 7 shows a flowsheet identifying booths 90, 92 and 94. Booth 90 is located in New York City in a restaurant along with a number of other booths in that location (not shown). Booths 92 and 94 are shown as being in Paris and Los Angeles, respectively. The booth 90 in New York is associated with a system 100 including a local area network (LAN) 101. The LAN 101 links with broadcast TV 103, computer games, programming, productivity tools 105, satellite TV 107, cable TV 109, internet access 111, and management, scheduling, and the like 113. Each of these functions can be linked to the media booth(s) 90. The system 100 also has videoconferencing technology (V/C) 115 linking the LAN with the media booth(s) 90. In addition the technology 115 includes videoconferencing via the internet 117 and video-conferencing via dial-up 119. The video-conferencing via the internet can be, for example a one-on-one type between a computer in the restaurant bar area and another computer elsewhere. The video-conferencing dial-up can be between a private room in the restaurant and another site or video-conferencing phone booths as described above. The LAN 93 is with linked with other LANS 120 and 122 via a network carrier 125 as is known. In this way, the booth 90 can videoconference with a booth in Paris 92 or a booth in Los Angeles 94 as part of the restaurant network.

The invention offers advantages in that state-of-the-art technology can be showcased as part of the restaurant. This includes both the videoconferencing components and other components such as new software and the like. In fact, new software can be tried out by the public without the need for purchasing, such capability not existing in local retailers. Further, by the presence of waiters in the restaurant, hands-on knowledge is readily available to users when questions or problems arise with one or more of the features of the system and method. In addition, the restaurant will have the hardware capability to optimize the software, such capability not always available to individuals on their home or business computers. For example, state of the art hardware in terms of graphics capability, RAM, and the like will be available to enhance software performance.

The combination of a networked system in a public setting, i.e., a restaurant, also offers the advantage that, as the network grows, so does the strength of the system, increasing exposure, revenues and customer appeal.

As such, an invention has been disclosed in terms of its preferred embodiments and is directed to an improved system and method combining dining, videoconferencing and multi-media access in a restaurant environment. Accordingly, the invention should only be limited by the terms of the appended claims.

We claim:

1. A restaurant videoconferencing system comprising:
   a) a first plurality of booths installed as part of at least a first restaurant located in a first geographic location, a number of the first plurality of booths being located in an open area designed to promote high quality video conferencing, dining as well as to accommodate movement of restaurant workers and patrons, wherein the plurality of first booths are open to each other to promote a restaurant interactive social atmosphere;
   b) a second plurality of booths installed as part of at least a second restaurant located in a second geographic location, a number of the second plurality of booths being located in an open area sized to accommodate movement of restaurant workers and patrons, wherein the plurality of second booths are open to each other;
   c) the number of booths in each of the first and second locations being equipped with at least one flat viewing screen and connected via a private network providing both videoconferencing between booths in different geographic locations and multi-media access for each booth, wherein each booth has a curved table with a plurality of seating areas, directional microphones and speakers integrated within each booth, the curved table and the plurality of seating areas arranged so that viewing screen is sized and located to be visible from the plurality of seating areas, the plurality of seating areas further arranged so that individuals seated therein are in a face to face relationship during video conferencing with other individuals at a remote booth, the flat viewing screen having a wide aspect ratio and near eye level camera to enhance camera functionality and allow images of the plurality of individuals to fit in a natural configuration on the flat viewing screen during videoconferencing, adjacent booths separated by glass partitions to maximize booth privacy and inter-party communication and minimize intra-booth noise, and the table sized to accommodate serving a meal to a plurality of individuals in the seating areas;
   wherein the booths of the first geographic location are in a different time zone from the booths in the second geographic location;
   wherein each booth has high speed internet access, access to cable or satellite TV, access to a central server of computer games and programs, and access to productivity tools and resources;
   wherein the booths in each of the restaurants:
   i) are equipped with videoconferencing equipment that is part of the restaurant and which enables booths to videoconference with other booths within the private network and is capable of at least MPEG-2 speeds, and a computer having internet functionality, codec for compression and decompression of videoconferencing signals, a keyboard and a devices for multimedia access, and
   ii) are connected to a point of sale system adapted to track and charge use of the multimedia access and videoconferencing by patrons in each booth.

2. The system of claim 1, wherein each booth has access to both of cable TV and satellite TV.

3. The system of claim 1, wherein each restaurant also includes at least one room, said at least one room having videoconferencing capability for a group of patrons to perform videoconferencing with other individuals at other restaurants via the private network.

4. The system of claim 3 wherein said at least one room has a computer station with videoconferencing capability for an individual to perform videoconferencing with other individuals at other restaurants via the private network.

5. The system of claim 1, wherein multiple parties interact at each booth for one of social and business pleasure in a public setting.

6. A method of restaurant videoconferencing comprising the steps of:
   a) providing a plurality of videoconferencing booths in each of a number of restaurants, wherein at least two restaurants are in different time zones, each restaurant in a particular geographic location, the plurality of videoconferencing booths of each restaurant are installed as part of the restaurant and are located in an open area sized to accommodate movement of restaurant workers and patrons wherein the plurality of videoconferencing booths are open to each other to promote a restaurant interactive social atmosphere, wherein each booth has a flat viewing screen, a curved table with a plurality of seating areas, directional microphones and speakers integrated with the booth, the plurality of seating areas arranged so that viewing screen is visible from the plurality of seating areas, the plurality of seating areas further arranged so that individuals seated therein are in a face to face relationship during video conferencing with other individuals at a remote booth, the flat viewing screen having a wide aspect ratio and near eye level camera to enhance camera functionality and allow the plurality of individuals to naturally fit on the flat viewing screen during videoconferencing, adjacent booths separated by glass partitions to maximize booth privacy and inter-party communication, and the table sized to accommodate serving a meal to a plurality of individuals in the seating areas;
   b) conducting videoconferencing between users in at least two booths in different restaurant locations at speeds of at least MPEG-2 using a codec in each booth for decompression and compression while offering food and beverages to the users in each booth, wherein the booths in the number of restaurants are interconnected by a private videoconferencing network, and each booth is equipped with video-conferencing equipment as part of the restaurant for enabling videoconferencing with booths at another restaurant in different geographic location; and
   c) providing on site support by live personnel to aid in selection of media resources, videoconferencing, and technical assistance as needed;
   wherein each of internet surfing, computer gaming, resources and computer programs are provided during step (a) via computer hardware located at each booth, and one or more of cable TV viewing, broadcast TV viewing, satellite TV are provided during step (a); and a plurality of individuals are present at each booth and interact at each booth for one of social and business pleasure in a public setting; and
   wherein patrons in each booth are charged for videoconferencing and services using a point of sale system.

7. The method of claim 6, comprising the step providing videoconferencing capability in private rooms for a group of patrons to perform videoconferencing with other individuals at other restaurants via the private network.

8. The method of claim 7, comprising the step of providing videoconferencing capability in rooms for an individual to operate a computer station to perform videoconferencing with other individuals at other restaurants via the private network.

9. The method of claim 6, where said at least two restaurants are located in different countries.

\* \* \* \* \*